April 9, 1929. J. W. WELSH 1,708,209
SPECTACLE TEMPLE AND METHOD OF MAKING THE SAME
Filed Sept. 5, 1924
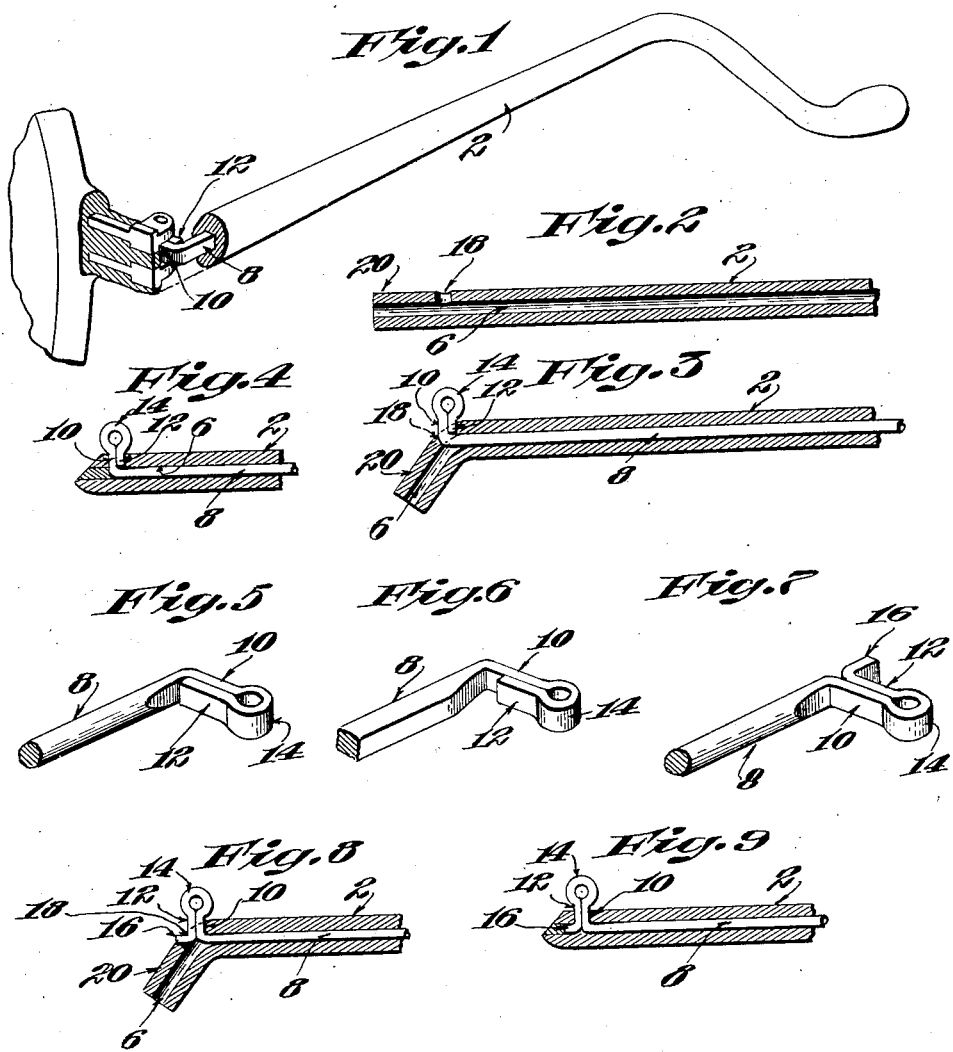
Inventor
James W. Welsh
by David Rines
Attorney Patented Apr. 9, 1929.

1,708,209

UNITED STATES PATENT OFFICE.

JAMES W. WELSH, OF PROVIDENCE, RHODE ISLAND, ASSIGNOR TO BAUSCH AND LOMB OPTICAL COMPANY, OF ROCHESTER, NEW YORK, A CORPORATION OF NEW YORK.

SPECTACLE TEMPLE AND METHOD OF MAKING THE SAME.

Application filed September 5, 1924. Serial No. 735,990.

The present invention relates to spectacle temples and methods of making the same.

The chief object of the invention is to provide a new and improved spectacle temple of the combined-metal-and-non-metallic type that shall be cheap to manufacture and very efficient in operation.

The invention will be described in connection with the accompanying drawings, in which Fig. 1 is a perspective view of a spectacle temple constructed according to a preferred embodiment of the present invention, shown hinged to a lens frame, with parts broken away, for clearness; Fig. 2 is a longitudinal, fragmentary section of a non-metallic tube that is adapted to be combined with a reinforcing rod to produce a temple according to the present invention; Fig. 3 is a similar section illustrating the step of introducing the reinforcing rod in the non-metallic tube; Fig. 4 is a similar section of the completed temple; Figs. 5 and 6 are fragmentary perspective views of a reinforcing rod that is adapted to be combined with the tube shown in Fig. 2 to produce a temple according to the present invention; Fig. 7 is a similar view of a modification; and Figs. 8 and 9 correspond to Figs. 3 and 4, respectively, of the modification shown in Fig. 7.

The preferred temple comprises a non-metallic member, shown as a seamless tube 2, preferably tapering on its outer surface from the forward end towards the rear end, as is illustrated more particularly in Fig. 1. A reinforcing member, such as a metal rod, is enclosed in the bore 6 of the tube. The reinforcing rod is provided with a body portion 8, an intermediate portion 10 bent away from the body portion substantially at right angles thereto, and an end portion 12 doubled over upon the intermediate portion 10 into contact therewith. An eye 14 is provided at the junction between the end portion 12 and the intermediate portion 10.

If desired, the intermediate and the end portions may be of smaller thickness than the body portion 8, and they may be provided with flat faces at their contacting surfaces. To this end, the cross section of the rod may be rectangular, as shown in Fig. 6, but the body portion may be cylindrical, as shown in Fig. 5. The provision of the flat faces permits the portions 10 and 12 becoming readily soldered together to form an integral union.

The end portion 12 may be doubled over upon the intermediate portion 10 in a direction towards the body portion, as is illustrated in Figs. 3 to 6, inclusive, or in a direction away from the body portion, as is illustrated in Figs. 7 to 9, inclusive. In the latter event, the end portion 12 may be provided with a projection 16 extending in line with the body portion.

To assemble the tube 2 with the reinforcing rod, the body portion is mounted in the bore 6 of the tube through an opening 18 provided in the side of the tube 2, near one end. To facilitate the assembling operation, the end portion 20, to one side of the opening 18, is bent out of line with the axis of the tube, as is illustrated in Figs. 3 and 8. After the rod has been mounted in place, the end portion 20 is restored to its former position, as illustrated in Figs. 4 and 9. The eye 14 is left extending through the opening 18 and beyond the side of the tube.

The projection 16 may be bent out of line with the body portion 8 prior to the mounting of the rod in the bore of the tube, so as to fit into the bore of the bent-away portion 20. The projection 16 may then be straightened with the end portion 20. In practice, however, if the projection 16 is not too long, it is unnecessary to bend the projection 16, as the latter will fit into the bore of the end portion 20 when the tube is restored to its normal shape, without such bending.

The ends of the tube 2 may be plugged with non-metallic material in a manner that is now well known, or closed in any other desired manner, completing the temple.

Other modifications will readily suggest themselves to persons skilled in the art, and all such are considered to be within the spirit and scope of the present invention, as defined in the appended claims.

What is claimed is:

1. A spectacle temple comprising a rod having a body portion, an intermediate portion bent away from the body portion substantially at right angles to the body portion, and an end portion doubled over upon the intermediate portion into contact with the intermediate portion, the rod having an eye at the point where the end portion is joined to the intermediate portion.

2. A spectacle temple comprising a rod having a body portion, an intermediate portion bent away from the body portion, and an end portion doubled over upon the intermediate portion into contact with the intermediate portion, the intermediate portion and the end portion being of smaller thickness than the body portion and being provided with flat faces at their contacting surfaces, and the rod having an eye at the point where the end portion is joined to the intermediate portion.

3. A spectacle temple comprising a rod having a body portion, an intermediate portion bent away from the body portion and extending in substantially a straight line, and an end portion doubled over upon the intermediate portion into contact with the substantially straight intermediate portion, the contacting portions being integrally secured together, the rod having an eye at the point where the end portion is joined to the intermediate portion.

4. A spectacle temple comprising a rod having a body portion, an intermediate portion bent away from the body portion, and an end portion doubled over upon the intermediate portion into contact with the intermediate portion, the contacting portions being soldered together, the rod having an eye at the point where the end portion is joined to the intermediate portion.

5. A spectacle temple comprising a rod having a body portion, an intermediate portion bent away from the body portion, and an end portion doubled over upon the intermediate portion in a direction away from the body portion into contact with the intermediate portion, the end portion having a projection extending in line with the body portion, and the rod having an eye at the point where the end portion is joined to the intermediate portion.

6. A spectacle temple comprising a rod having a body portion and a portion projecting from the body portion substantially at right angles to the body portion and provided with an eye, and a non-metallic covering for the body portion, the projecting portion being disposed at an intermediate portion of the covering.

7. A spectacle temple comprising a rod having a body portion, an intermediate portion bent away from the body portion, and an end portion doubled over upon the intermediate portion into contact with the intermediate portion, the rod having an eye at the junction between the end portion and the intermediate portion, and a non-metallic tube in which the body portion is mounted, the eye extending beyond the tube.

8. A spectacle temple comprising a rod having a body portion, an intermediate portion bent away from the body portion, and an end portion doubled over upon the intermediate portion into contact with the intermediate portion, the rod having an eye at the junction between the end portion and the intermediate portion, and a non-metallic tube in which the body portion is mounted, the tube having an opening in its side near one end, and the eye extending through the side opening of the tube.

9. A spectacle temple comprising a rod having a body portion, an intermediate portion bent away from the body portion, and an end portion doubled over upon the intermediate portion in a direction away from the body portion into contact with the intermediate portion, the end portion having a projection extending in line with the body portion, the rod having an eye at the junction between the end portion and the intermediate portion, and a non-metallic tube in which the body portion is mounted, the tube having an opening in its side near one end, the eye extending through the side opening of the tube, and the projection lying in the tube on the other side of the side opening from that in which the body portion is mounted.

10. A method of making an article of the class described that comprises providing a rod having alined portions separated by a portion projecting from the alined portions, providing a tube with a side opening, bending the tube at a point where the side opening is located, mounting one of the alined portions in the bent tube on one side of the opening, mounting the other alined portion in the bent tube on the other side of the opening, and restoring the bent tube to its original form.

11. A method of making a spectacle temple that comprises providing a rod having a body portion and a portion projecting from the body portion provided with an eye, providing a tube with a relatively small side opening, the sides of the tube being closed except at the side opening, and inserting the body portion in the tube through the side opening.

12. A method of making a spectacle temple that comprises providing a metal rod having a body portion, an intermediate portion bent away from the body portion, and an end portion doubled over upon the intermediate portion in a direction away from the body portion into contact with the intermediate portion, the end portion having a projection extending in line with the body portion, and the rod having an eye at the junction between the end portion and the intermediate portion, providing a non-metallic tube with a side opening, bending the tube at a point where the side opening is located, correspondingly bending the rod at a point between the body portion and the projection, mounting the body portion in the bent tube on one side of the opening, mounting the projection in the bent tube in the other side of the opening and straightening the tube and the rod.

13. A spectacle temple comprising a rod having a body portion, an intermediate portion bent away from the body portion, and an end portion doubled over upon the intermediate portion into contact with the intermediate portion, the rod having an eye at the junction between the end portion and the intermediate portion, and a non-metallic covering in which the body portion is mounted, the eye extending beyond the covering.

In testimony whereof, I have hereunto subscribed my name this 21st day of Aug., 1924.

JAMES W. WELSH.